United States Patent [19]

Mano

[11] Patent Number: 5,186,501
[45] Date of Patent: Feb. 16, 1993

[54] SELF LOCKING CONNECTOR

[76] Inventor: Michael E. Mano, 18501 S. Dalton Ave., Gardena, Calif. 90248

[21] Appl. No.: 674,455

[22] Filed: Mar. 25, 1991

[51] Int. Cl.$^5$ .............................................. F16L 55/00
[52] U.S. Cl. ..................................... 285/89; 285/902; 403/320
[58] Field of Search ........................... 285/89, 92, 902; 403/320, 342; 411/132, 134, 143, 144, 147, 149, 150, 155, 156, 229, 261, 293, 312, 314, 326, 154, 240, 955, 956, 963

[56] References Cited

U.S. PATENT DOCUMENTS

| | | | |
|---|---|---|---|
| 3,221,792 | 12/1965 | Poupitch | 411/144 X |
| 3,438,416 | 4/1969 | Thurston | 411/143 X |
| 3,608,933 | 9/1971 | Lee | 285/89 X |
| 4,286,807 | 9/1981 | Bachli | 285/89 |
| 4,940,260 | 7/1990 | Odriozola | 285/92 X |
| 5,011,351 | 4/1991 | Terry | 411/156 X |

Primary Examiner—Michael F. Trettel

[57] ABSTRACT

A self-locking connector comprising first and second tubular fittings, the first fitting having an annular intermediate shoulder and a threaded end, and the second fitting having an annular shoulder adjacent one of its ends. A nut is rotatably mounted on the second fitting and threaded to the threaded end of the first fitting, and the nut has a flanged end which is adapted to engage the shoulder on the second fitting to bring the two fittings into axially aligned mating and sealing relationships as the nut is tighten onto the threaded end of the first fitting. A frusto-conical shaped resilient lock washer is interposed between the shoulder on the first fitting and the nut. The adjacent edges of the nut and the washer have mating ramps formed thereon, with each ramp having an angle greater than the helical angle of the threads of the first fitting and of the nut. When the nut is tighten, the ramps on the washer and on the nut mate with one another, and effectively lock the nut against rotation with respect to the first fitting.

4 Claims, 2 Drawing Sheets

SELF LOCKING CONNECTOR

BACKGROUND OF THE INVENTION

A simple self-locking connector is provided to interconnect the adjacent ends of tubular conduits, particularly in aircraft, and for holding the conduits coupled to one another in a fluid-type relationship in the presence of vibrations. It is well known that connectors used on aircraft are subject to vibrations so that they may loosen and allow leakage. Consequently, there is a tendency for mechanics to tighten such connectors excessively and thereby damage them.

Many connectors have been proposed in the past in attempts to assure that their mating parts will be locked together and cannot be accidentally loosened as a result of vibrations. One approach has been to attach keepers to the connector which use lock wires, cotter pins, keys, back-up nuts, lock washers, etc. Although such keepers have proven to be effective for some purposes, they require extra parts and additional assembly operations. Also, it is particularly difficult to install the keepers when the connector is in a location which is not readily accessible.

The present invention provides a self-locking connector which overcomes the disadvantages described above. The connector of the invention is simple and economical in its construction, and it is capable of being reused a large number of times. The connector of the invention is also rugged in its construction and reliable in its operation.

SUMMARY OF THE INVENTION

A connector which comprises first and second tubular fittings that are held together in axially aligned sealed relationship by a nut which is rotatably mounted on the first fitting and which is coaxially positioned with respect to the two fittings. The nut is threaded onto a threaded end of the first fitting, and the nut has a flange at its other end which engages an annular shoulder on the second fitting. As the nut is tighten onto the threaded end of the first fitting, it draws the two fittings together so that an annular sealing surface on the end of the second fitting is drawn into sealing relationship with an annular seat in the end of the first fitting. An integral hexagonal shoulder is coaxially formed on the first fitting, and a frusto-conical Belleville type resilient washer is interposed between the hexagonal shoulder and the forward end of the nut. As the nut is tightened, it engages the Belleville washer and compresses it axially as the sealing surface of the second fitting seats into the seat in the first fitting. The Belleville washer is compressed between the hexagonal shoulder and the end of the nut, and due to its spring effect it creates a high frictional resistance to backwards rotation of the nut. In accordance with the invention, the adjacent edges of the Belleville washer and the nut are configured to define mating ramps, each ramp having an inclination angle which is greater than the helical angle of the threads of the nut and of the first fitting, so that the nut is effectively locked on the first fitting.

DETAILED DESCRIPTION OF THE ILLUSTRATED EMBODIMENT

The connector of the invention includes a first tubular fitting 10 and a second tubular fitting 12. Tubular fitting 10 has an external thread at one end, designated 14 and it also has an intermediate shoulder 18 having an hexagonal configuration, to receive a wrench to assist in tightening the mating parts of the connector.

Figure 1:
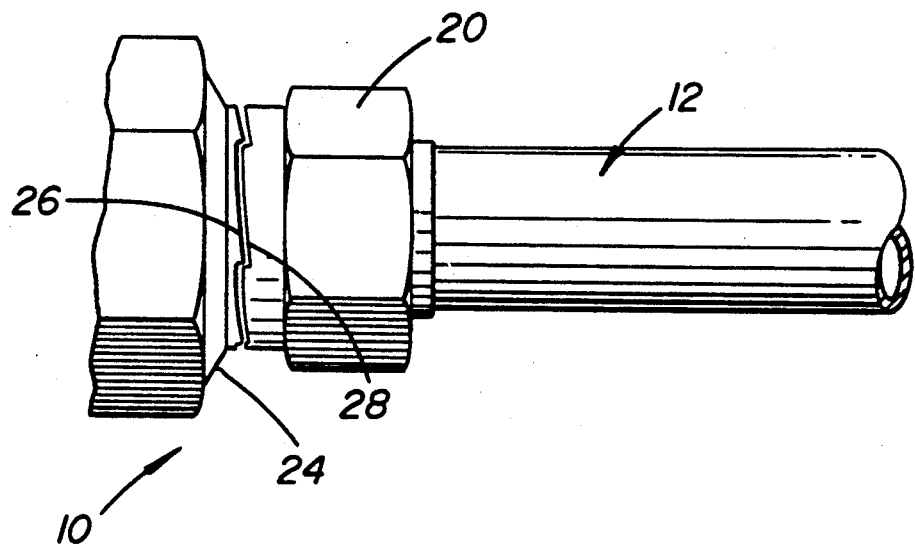
FIG. 1 is a side elevation of a connector constructed in accordance with the concepts of the invention.
Figure 2:
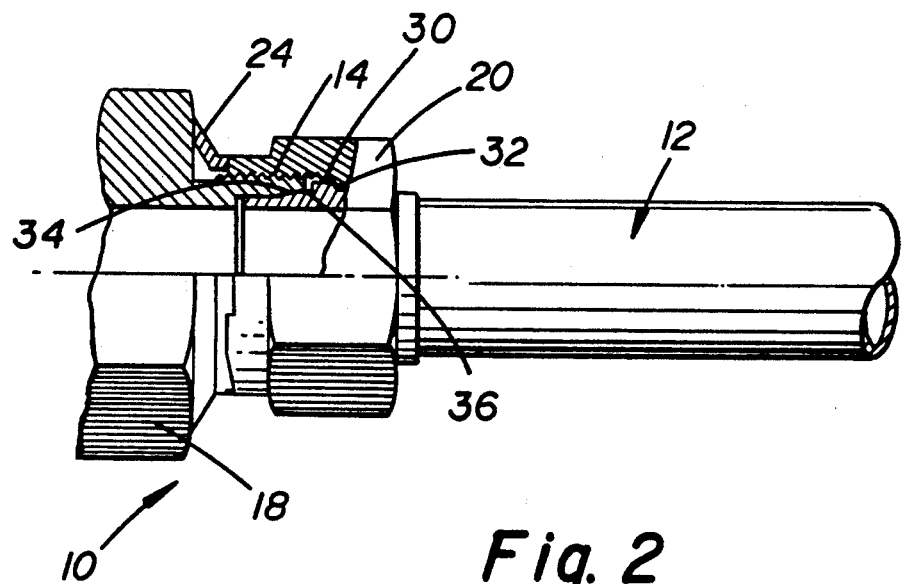
FIG. 2 is a view like FIG. 1 but partially in section.
Figure 3:
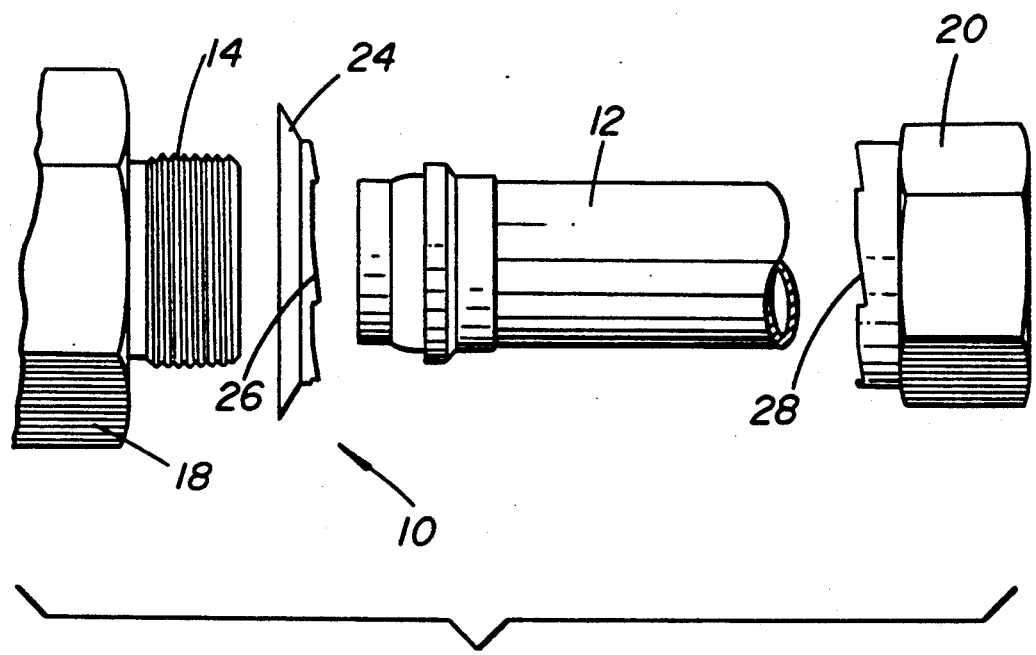
FIG. 3 is a perspective exploded view showing the various components of the connector.
Figure 4:
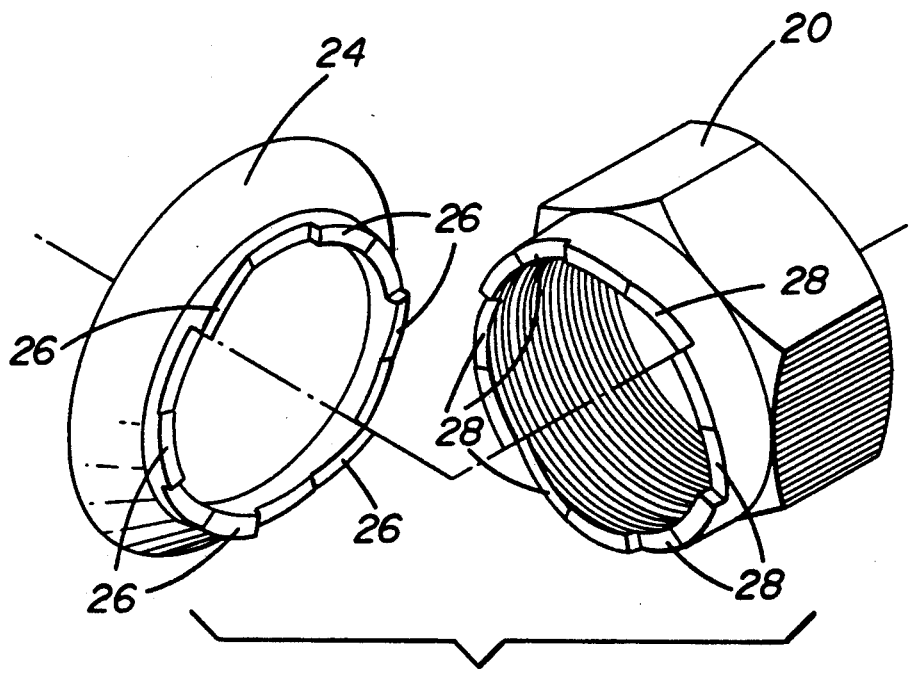
FIG. 4 is a perspective view of two of the components of the connector.

A nut 20 is fitted over the second rotatably fitting 12 and threaded to the threaded end 14 of fitting 10. Nut 20 has an inwardly extending annular flange 32 at its rear end which engages an annular shoulder 30 on fitting 12. As the nut is tightened onto the threaded end 14 of fitting 10, a annular sealing surface 36 on the end of the fitting 12 is drawn into sealing relationship with an annular seat 34 formed in the end of fitting 10. A Belleville washer 24 is interposed between the nut 20 and the shoulder 18. Belleville washer 24 is a resilient washer, have a frusto-conical configuration. The Belleville washer 24 is compressed as the nut 20 is tighten onto the threads of the threaded end 14 of fitting 10 to perform a locking function. In addition, the forward edge of Belleville washer 24 has a series of ramps 26 (FIG. 4) formed around its periphery, and the adjacent edge of nut 20 has a like series of ramps 28. The ramps 26 and 28 mate with one another when the nut 20 is tighten onto the threads 14 of the first fitting 10.

The angle inclination of each ramp 26 and 28 is made greater than the helical pitch of the external threads of threaded end 14 or fitting 10 and the internal threads of nut 20, so that the ramps prevent relative rotation of the nut 20 and the fitting 10, so as to enhance the locking characteristics of the Belleville washer 24.

The invention provides, therefore, an improved connector which is simple in its construction, and yet which is sturdy and reliable in operation.

It will be appreciated that while a particular embodiment of the invention has been shown and described, modifications may be made. It is intended in the Claims to cover all modifications which come within the true spirit and scope of the invention.

I claim:

1. A self-locking connector comprising: first and second tubular fittings, said first fitting having an annular intermediate shoulder and at least a first end of said first fitting having external threads, and said second fitting having an annular shoulder adjacent one end thereof; a nut having internal threads and adapted to be threaded to the first end of said first fitting and having a flanged end adapted to engage the shoulder on said second fitting to bring the two fittings into axially aligned mating and sealing relationship as the nut is tighten on the first fitting; a frusto-conical shaped resilient lock washer interposed between the shoulder on the first fitting and the nut, the adjacent edges of said nut and said washer having mating ramps formed thereon, each of said ramps having an angle greater than the helical angle of the threads of said first fitting and of said nut, said washer ramps projecting outwardly from the adjacent edge of said washer.

2. The self-locking connector defined in claim 1, in which said shoulder on said first fitting has a hexagonal configuration for receiving a wrench.

3. The self-locking connector defined in claim 1, in which the mating end of said first fitting has an annular seat formed thereon and the mating end of said second fitting has a sealing surface formed thereon to be received in said annular seat in sealing relationship therewith when said nut is tightened on the threaded end of said first fitting.

4. A self-locking connector comprising: first and second tubular fittings, at least one end of said first fitting having external threads formed thereon; a nut having internal threads adapted to be threaded to the threads of said first fitting to bring the two fittings into axially aligned mating and sealing relationship as the nut is tightened onto the threads at the threaded end of said first fitting; and a frusto-conical resilient lock washer interposed between said nut and said first fitting, the adjacent edges of said nut and said washer having mating ramps formed thereon, each such ramp having an angle greater than the helical angle of the threads of said first fitting and of said nut, said washer ramps projecting outwardly from the adjacent edge of said washer.

* * * * *